United States Patent [19]

Nemirovsky

[11] Patent Number: 4,880,219

[45] Date of Patent: Nov. 14, 1989

[54] TILTING APPARATUS

[75] Inventor: Robert Nemirovsky, 1117 Hyman Ave., Bay Shore, N.Y. 11706

[73] Assignees: Robert Nemirovsky, Bay Shore, N.Y.; Joseph Deutsch, Commack, N.Y.

[21] Appl. No.: 186,889

[22] Filed: Apr. 27, 1988

[51] Int. Cl.⁴ .............................................. B23Q 3/18
[52] U.S. Cl. .................................... 269/60; 74/502.3; 74/99 R
[58] Field of Search ....................... 269/60, 58, 55, 65, 269/71, 73, 76, 289 R, 289 M R, 309; 108/1, 6, 7; 74/502.3, 501.5 R, 502, 99 R, 110; 384/2, 40; 33/DIG. 12, 534, 533, 536, 537

[56] References Cited

U.S. PATENT DOCUMENTS

| 2,408,786 | 10/1946 | Lombardi | 74/110 |
| 2,968,517 | 1/1961 | Daugherty | 311/38 |
| 3,807,034 | 4/1974 | Pevzner | 29/559 |
| 4,703,922 | 11/1987 | Schell | 269/71 |

OTHER PUBLICATIONS

Klinger Scientific Catalog 584C—p. 89.

Primary Examiner—Frederick R. Schmidt
Assistant Examiner—David A. Holmes

[57] ABSTRACT

A tilting apparatus includes at least a pair of elements with curved surfaces arranged to tilt a platform with respect to a base. The apparatus is capable of tilting with a resolution in the order of a fraction of an arc second, with precision, reliability, and repeatability.

15 Claims, 2 Drawing Sheets

TILTING APPARATUS

BACKGROUND OF THE INVENTION a. Field of Invention

This invention pertains to an apparatus for tilting or turning equipment, and more particularly for pivoting a relatively heavy piece of equipment around a particular axis by a small angle in the range of a few arc degrees, with a great degree of precise resolution and repeatability.

b. Description of the Prior Art

It is frequently desirable to tilt or turn relatively heavy objects around a horizontal, a vertical or an arbitrary axis with an accuracy in the order of an arc second. In certain applications, such as for example in the art of machining precise components, and in the art of directing a beam of light such as laser beam along a preselected axis, it is very important to be able to turn objects with precisely controlled tilt and repeatedly. However all the prior art devices presently available cannot perform these functions with sufficient resolution and repeatability. For example, in Klinger Scientific catalog 584C, published by the Klinger Scientific, 110-20 Jamaica Avenue, Richmond Hill, N.Y. 11418-9970, page 89 an inclination stage type TG is shown which may be used to provide a tilt of about 2½ degrees. The device disclosed in the catalog consists of two generally parallel plates hingedly connected at one side. The device also includes a micrometer with a nut mounted on the top plate. This nut is engaged by a plunger with a handle. Turning the handle clockwise applies a force on the bottom plate and repulsion forces the top plate upwards. Turning the handle counter-clockwise releases the plunger and allows the top plate to sink. The load on the top plate is supported by and transferred directly to the threads of the plunger. The catalog discloses three models for loads of 1.2, 3.8 and 8 kilograms respectively. The weight of the object mounted on the device, its accuracy, and repeatability are limited by the size and pitch of the screw. Furthermore this device is expensive. Another disadvantage of this device is that apparently it is capable of tilting an object mounted on its upper plate only around a substantially horizontal axis.

U.S. Pat. No. 3,807,034 to Pevzner et al discloses a device for trueing a table carrying a heavy object. As shown in FIG. 3 of the Patent, this device makes use of complicated bevel gears 11, 12 and pneumatic cylinder 10, and therefore it is expensive and inaccurate.

U.S. Pat. No. 2,968,517 to Daugherty et al shows a table for tilting and indexing device for tilting heavy objects. The device includes a gimbal 37 positioned at the center of the device and end platforms for pivoting.

OBJECTIVES AND SUMMARY OF THE INVENTION

In view of the above it is an objective of the present invention to provide an apparatus for tilting objects which is very accurate, and can be used repeatedly to achieve the same angle of tilt.

Another objective of the present invention is to provide an apparatus which can be used to turn an object around any axis.

A further objective is to provide an apparatus for turning an object with a high degree of repeatability.

These and other objectives of the invention shall become apparent from the following description thereof. Briefly, the present invention comprises of a platform and a stationary base, having first and second elements respectively with corresponding first and second curved surfaces cooperating by mutual slipping and some rotation to cause said platform to tilt when a force is applied to one of said elements.

BRIEF DESCRIPTION OF THE FIGURES

FIG. 3 shows a side-sectional view of the apparatus of

FIG. 1 taken along line III—III in FIG. 2;

DETAILED DESCRIPTION OF THE INVENTION

Figure 1:
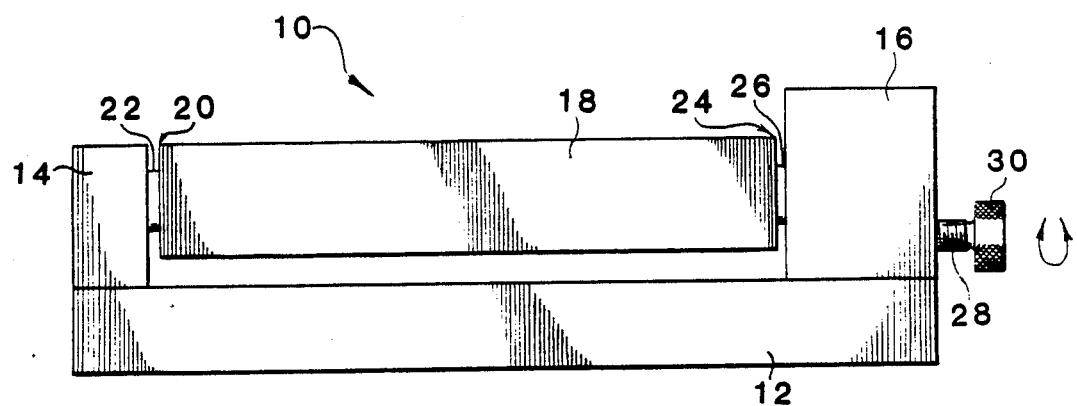
FIG. 1 shows a side view of a tilting apparatus constructed in accordance with this invention.

In the following description directional terms such as up and down are used merely for purposes of illustration, it being understood that the subject apparatus is operational in any orientation. Referring now to the Figures, an apparatus 10 for tilting objects in accordance with this invention includes a base 12 having a relatively flat section 12' and two uprights 14 and 16 oriented generally normally to the section 12'. Uprights 14 and 16 hold a platform 18 used to support an object (not shown) by conventional means such as mounting screws, clamps, vacuum devices, etc. Platform 18 has a first side 20 connected to upright 14 by hinging means 22 to be described later. Opposite side 20, platform 18 has a second side 24 and in between this side 24 and upright 16 there is a mechanism 26 including a ball 44 which forces platform 18 to pivot around the hinging means 22. Extending out of upright 16 there is a screw 28 terminating in a knob 30. The uprights 14 and 16 may be secured to the section 12' by screws, or by other conventional means.

Figure 2:
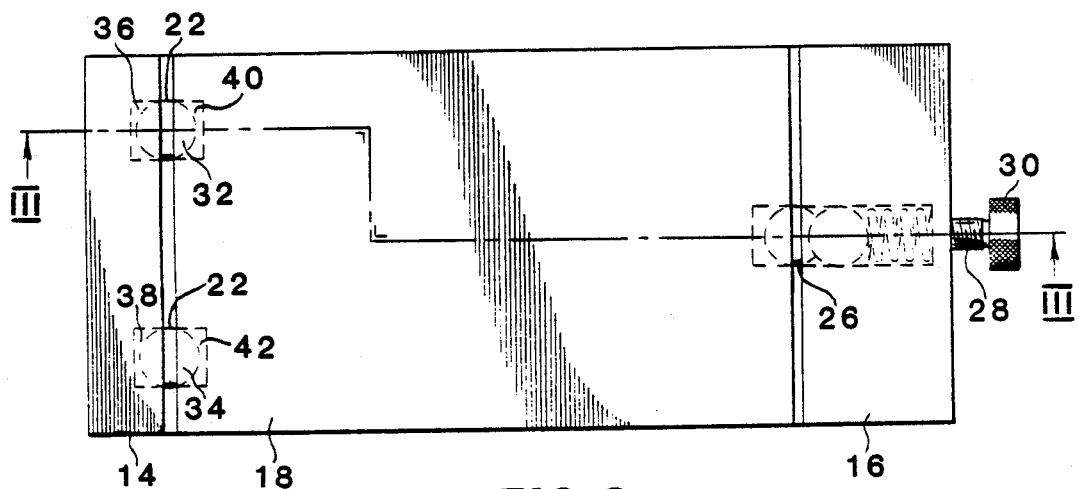
FIG. 2 shows a plan view of the apparatus of FIG. 1.
Figure 3:
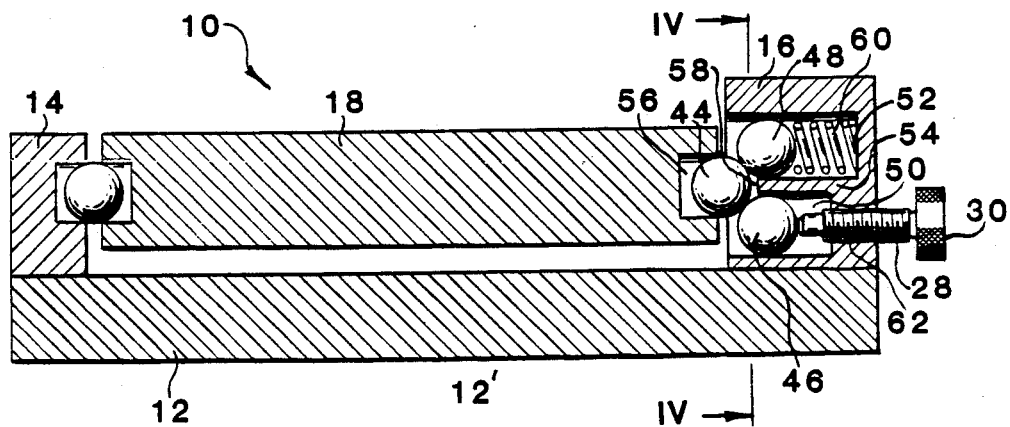
Figure 4:
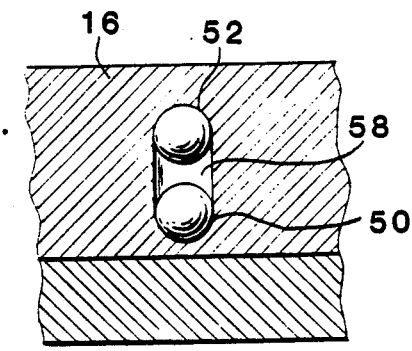
FIG. 4 shows a partial side view of the appratus of Figure 1 taken along line IV—IV in FIG. 3.

As shown in FIGS. 2 and 3, the hinging means 22 may comprise a pair of balls 32, 34. Upright 14 is formed with two cavities 36,38 opening toward platform 18 as shown. Similarly, platform 18 has two cavities 40, 42 facing cavities 36, 38 respectively. The cavities cooperated to house and capture balls 32 and 34 respectively between the platform and upright 14. It will be recognized by one skilled in the art that other hinging means may also be used between these two elements.

Referring now to FIG. 3, the mechanism for pivoting the platform 18 includes three balls 44, 46 and 48. Balls 46 and 48 are housed in cavities 50 and 52 respectively. A wall 54 separates cavities 50, 52 as shown. Another cavity 56 is shown for housing at least partially ball 44. Opposite ball 44, wall 54, and cavities 50 and 52 are recessed as at 58 to accommodate ball 44. Ball 48 is urged towards ball 44 by a compression spring 60 disposed in cavity 52. Similarly ball 46 is urged toward ball 44 by screw 28 extending into cavity 50 through a threaded hole 62 which engages screw 28. The invention operates as follows. Spring 60 applies a preselected load on the three balls, and through the platform on balls 32, 34 so that the elements of the apparatus are in a stable stationary position independent of their orientation. When knob 30 is turned in one direction, e.g. clockwise, it applies a force along the axis of the screw 28 and ball 46 urging the ball 46 in a direction parallel to the longitudinal axis of the platform 18. As a result of this force, ball 46 moves towards platform and forces ball 44 upwards. In turn, ball 44 pushes ball 48 backwards, away from the platform, compressing spring 60. Thus as orientated in FIG. 3, platform 18 is turned counterclockwise. When knob 30 is turned in the opposite direction, the spring 60 pushes ball 48 towards the platform, which in turn pushes ball 44 generally downward, thereby turning platform 18 clockwise. The present apparatus has the following advantages over the prior art: first, the pitch and the precision of the threads on screw 28 do not play a major role in the apparatus, and have relatively little effect on its accuracy or resolution. Second, only a fraction of the load (i.e. of the weight of the object on the platform) is transferred to the screw. In the present apparatus, the translation of the screw along its longitudinal axis is transformed into the movement of the preloaded balls. Third, it is believed that the high degree of resolution, repeatability and reliability achieved by the present apparatus are due to the slipping between the three preloaded balls 44, 46 and 48. For best results, these balls should be made of hardened steel and should be highly spherical. As the platform is turned with respect to the base, by the rotation of the screw 28 as described above, the balls may be rotating around their respective axes.

In particular, a tilting apparatus constructed in accordance with this invention using ½ in balls and a platform 9⅝ in. long could be tilted at total angle of 2⅜ degrees, with a resolution of 0.6 arc second. Even higher accuracy and resolution can be achieved if the regular ordinary screw 28 is replaced by a micrometric screw, which will bear only a fraction of the load when compared to the prior art.

Figure 5A:
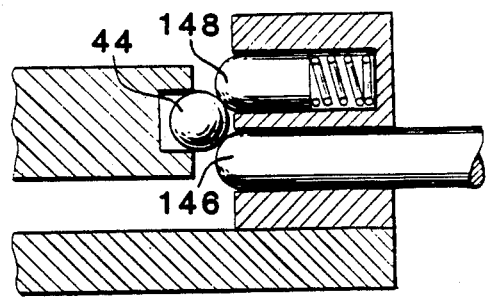
FIGS. 5a–d disclose a second embodiment of the invention.
Figure 5B:
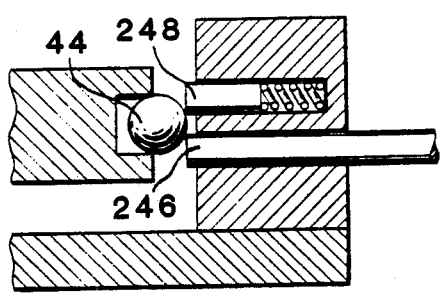
Figure 5C:
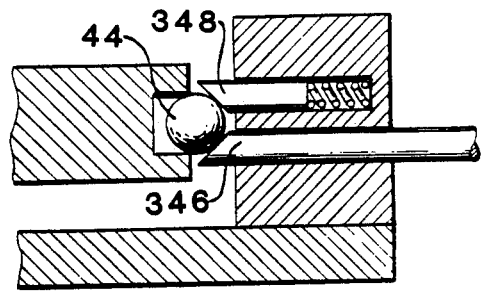
Figure 5D:
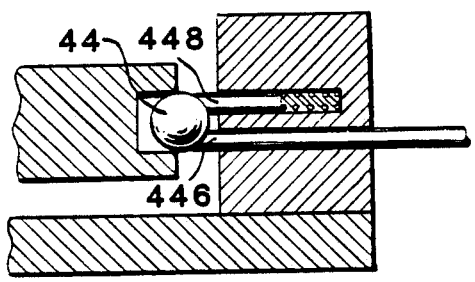
Figure 6:
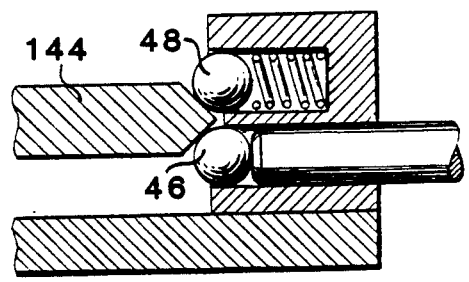
FIG. 6 shows a third embodiment of the invention.

The embodiment of FIGS. 1–4 is advantageous because it makes use of steel balls which are commercially available with hardened surfaces. Two other embodiments are disclosed in FIGS. 5 and 6. In the embodiment of FIG. 5, a steel ball 44 is still disposed in platform 18, however balls 46, and 48 have been replaced by elongated, rod shaped elements. In FIG. 5a, elements 146, 148 are terminated with hemispherical surfaces. Similarly in FIGS. 5b, 5c, and 5d elements 246, 248; 346,348 and 446,448 are terminated respectively by straight edges, oblique (angled) surfaces, or convex surfaces as shown. In the embodiment of FIG. 6, ball 44 is replaced by wedge 144.

In all the embodiments, spring 60 may be replaced by other means such as a stack of conical washers, such as Belville or spring washers. Furthermore screw 28 may be replaced by other actuating means which can be electric, hydraulic, pneumatic.

Obviously numerous modifications could be made to this invention without departing from its scope as defined in the appended claims.

I claim:

1. A tilting apparatus comprising:
   a. a base;
   b. a platform movably attached to the base;
   c. a first element disposed in said platform and having a first curved surface; and
   d. a second element disposed in said base and having a second curved surface in contact with said first curved surface, said first and second curved surface cooperating to tilt said platform with respect to said base when a force is applied to one of said first and second elements;
   e. wherein said base includes force application means for applying said force to said second element; and
   f. wherein said force tilts said platform in a first direction, said apparatus further comprising a third element for applying a counteracting force on one of said first and second elements for tilting said platform in a second direction.

2. The tilting apparatus of claim 1 wherein said platform has a first end pivotably connected to said base and a second end for holding said first element.

3. The tilting apparatus of claim 1 wherein said base includes a threaded hole and said force application means comprises a screw disposed in said hole and arranged to apply a force on said second element when said screw is rotated in a preselected direction.

4. The tilting apparatus of claim 3 wherein said third element is disposed in said base and has a third curved surface in contact with said first curved surface.

5. The tilting apparatus of claim 4 wheent said first, second and third elements are rotatable wherein said base.

6. The tilting apparatus of claim 5 further comprising spring means disposed in said base for urging said third element toward said first element.

7. The tilting apparatus of claim 5 wherein said first, second and third elements are spherical balls.

8. The apparatus of claim 1 wherein said first and second elements are spherical balls.

9. A tilting apparatus comprising:
   a. a platform with a first end, a second end, said first and second ends being arranged opposite each other;
   b. a base substantially coextensive with said platform;
   c. hinging means for hingedly connecting said platform to said base at said first end; and
   d. turning means for tilting said platform around said hinging means, said turning means including a first element having a first curving surface, said first element being coupled to said platform; and a second element having a second curved surface in contact with said first curved surface, said second element being coupled to said base, said first and second elements cooperating to tilt said platform with respect to said base by mutual slipping of said first and second elements when a force is applied to one of said first and second elements
   wherein said turning means includes a third element having a third curved surface, said third element being coupled to said base, said third element counteracting the force of said second element to tilt said platform in a direction opposite the direction of tilt generated by said first and second elements.

10. The tilting apparatus of claim 9 wherein said platform has a first cavity and said base has a second and third cavity; and said first, second and third elements are first, second and third balls disposed in said first, second and third cavities respectively.

11. The tilting apparatus of claim 10 further comprising means for applying a force on said second ball for tilting said platform.

12. The tilting apparatus of claim 11 wherein said means for applying a force comprises screw means extending into said second cavity.

13. The tilting apparatus of claim 12 further comprising counterforce means for applying a force on said third ball.

14. The tilting apparatus of claim 13 wherein said counterforce means comprises a spring disposed in said third cavity for urging said third ball toward said first ball.

15. A moving apparatus comprising:
  a. a base;
  b. a platform movably attached to the base;
  c. a first element disposed in said platform and having a first curved surface;
  d. a second element disposed in said base and having a second curved surface in contact with said first curved surface, said first and second curved surfaces cooperating to move said platform with respect to said base when a force is applied to one of said first and second elements;
  e. wherein said base includes force application means for applying said force to said second element.
  f. wherein said force moves said platform in a first direction, said apparatus further comprising a third element for applying a counteracting force on one of said first and second elements for moving said platform in a second direction.

* * * * *